Patented Apr. 24, 1934

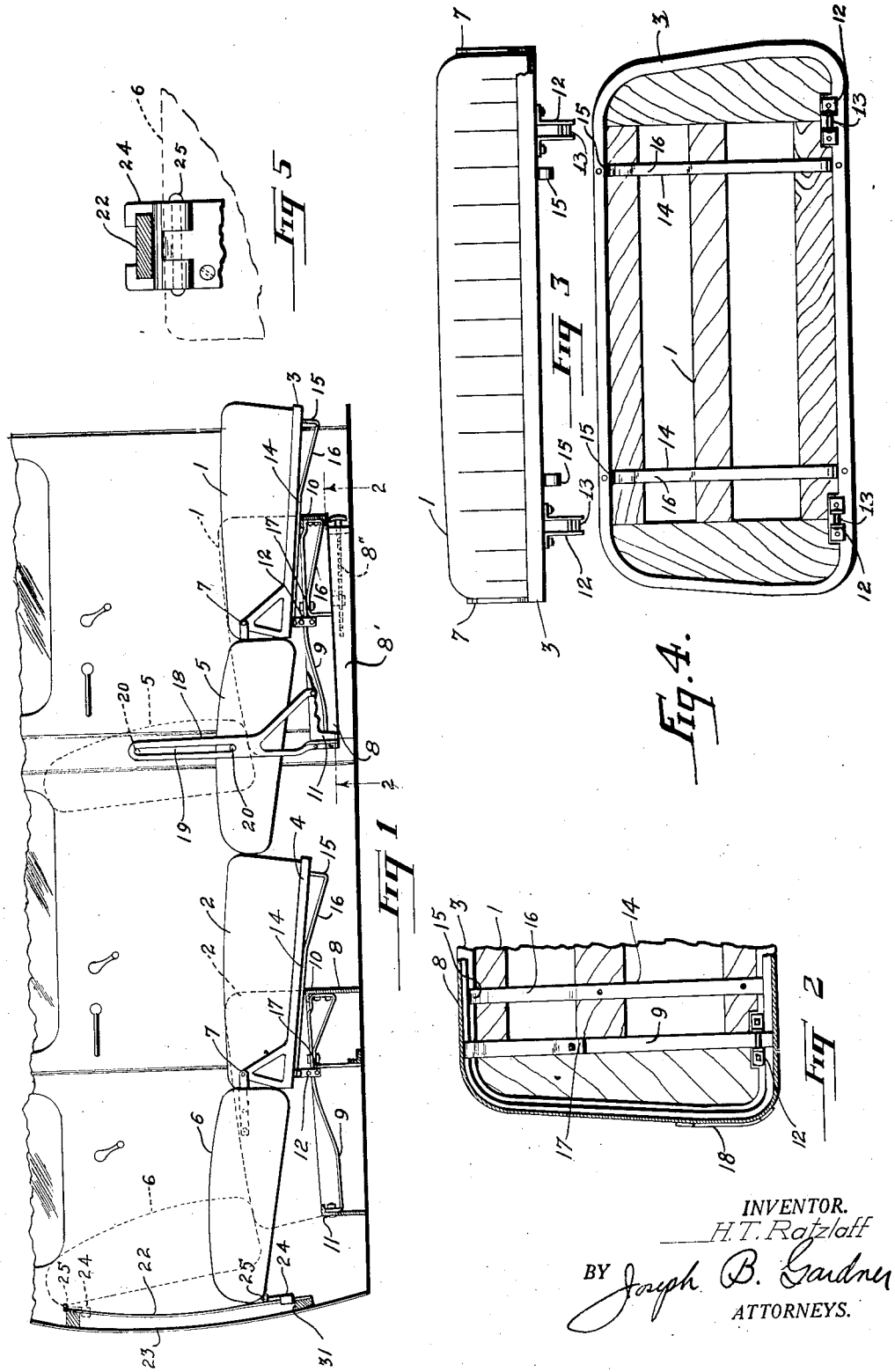

1,956,044

UNITED STATES PATENT OFFICE 1,956,044

AUTOMOBILE BED

Henry T. Ratzlaff, Oakland, Calif.

Application February 24, 1931, Serial No. 517,677

2 Claims. (Cl. 155—7)

This invention relates to improvements in automobile seats arranged to be converted into a bed by adjusting the seats into horizontal position.

An object is to provide a seat construction and seat mounting means which are comparatively simple and inexpensive, and require little or no modification of the ordinary sedan or coach types of automobile in the installation thereof in such automobiles, the seat construction aforesaid being provided with but simple changes in the regular types of automobile seats.

It is an important object of the invention to provide a means of connection between the seats and their supports which will permit of adjustment of the seats as aforesaid yet at all times, regardless of the position of the seats, will prevent vertical displacement of the seats out of operative relation to said supports and said means.

A further object of the invention is to provide an arrangement of the character described in which the means for adjustably carrying the seats and backs will be entirely invisible even with the doors of the automobile in open position.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing:

Figure 1 is a fragmentary sectional view of an automobile provided with the seats of my invention, the seats being shown in bed forming position by the full lines and in normal position by the dotted lines.

Figure 2 is a fragmentary horizontal sectional view of the front seat arrangement viewing same from beneath, the plane of the section being indicated by the line 2—2 on Figure 1.

Figure 3 is a front elevation of one of the seats showing the mounting means on the under side thereof.

Figure 4 is a bottom view of the seat as shown in Figure 3.

Figure 5 is a fragmentary plan view of the rear back guide rail and guide hinge back connections with parts broken away and in section.

Referring in general to the embodiment of this invention shown in the accompanying drawing, it is seen that the front and rear seats 1 and 2 are arranged with their frames 3 and 4 in an ordinary sedan and are provided with backs 5 and 6 secured to said frames by hinges 7 permitting the rearward and downward swinging thereof into the horizonal plane of the seats. In order to adjust the backs in this manner the seat frames are arranged to be moved forward of their supports 8, and preferably the frames and backs have guide connections with the supports 8 and other stationary parts of the body of the automobile. It is only necessary to slightly lift either seat frame and move it forwardly to bring the seat and its back into a common horizontal plane, as shown in Figure 1, the back being guided into its bed forming position. When both seat and back units are adjusted as aforesaid, they will lie in closely associated relation providing a comfortable full length bed. On the other hand, to return the seats and backs to normal position, the backs are raised and the seats will be drawn back to the normal position indicated by the dotted lines in Figure 1.

It will be understood where, as in some types of construction, the seats are provided with hinged backs permitting the adjustment here required, there need be no modifications to adapt them to the requirements of this invention. On the other hand, where the seat backs are not hinged or not suitably hinged, but a simple modification is necessary to render such backs adaptable for the purposes hereof.

The guide connections of the front and rear seats with the seat supports 8 comprise strap iron guide rails 9 extending between the front and rear sides 10 and 11 of said supports. Fixed on the under sides of the seat frames are guide brackets 12 which slidably embrace the guide rails in such manner as to permit of free forward and rearward sliding of the seats relative to the supports 8 but prevent vertical displacement of the seats out of operative relation to said supports. As here shown, the brackets 12 are provided with bearings 13 which engage the upper and lower sides of the rails 9. Preferably the guide brackets 12 are located near the rear longitudinal edges of the seat frames whereby the seats are permitted to be raised at their forward longitudinal edges high enough to afford access to tools and the like under the seat without removing the cushion.

Fixed on the underside of the seat frames 3 and 4 are longitudinally extending bearing bars 14 which slidably engage the supports 8 during the movement of the seat thereover. Preferably the bars 14 are so formed as to provide at their forward ends a stop 15 for preventing the forward displacement of the seats when in normal position, the stops being arranged to normally engage the rear face of the portion 10. It will be noted that with the bracket 12 serving as the fulcrum points, the forward end of the seats may be raised to lift the stops 15 from locking position to thus permit the forward movement of the seat. To provide for the ready return of the members 15 to locking position when the seats are returned from bed to normal position, the bars 14 are inclined as at 16 so that the seat will be automatically raised to allow the reengagement of the members. As a result of this formation the seats will slide freely over the supports 8 on the return movement, and will come to rest with the stops engaging behind said portions 10 to automatically lock seats as aforesaid. When the seats are adjusted forwardly, the brackets 12 engage suitable stops 17 which serve to limit such forward movement. Preferably the forward end of the guide rails 9 are so shaped that they serve as a bracket to prevent up and down flexing of the rails. In their forwardly adjusted positions, tilting of the seats will be curtailed by reason of the rearward positioning of the brackets 12 and the resistance of the back to the rearward rotation of the seat about the bracket 12 as a fulcrum. It is apparent that said guide connections may be quickly and easily installed without necessitating changing the construction of the seats or the supports 8 therefor, and are of an exceptionally simple and inexpensive formation, taking up no appreciable room and entailing little or no expense in their installation. It is important to note that since the track rails 9 and bearing bars 14 are both located entirely under the seats, none of such mechanism will be visible at any time, particularly when the doors of the automobile are opened. Furthermore such positioning of the mechanism at the bottom instead of at the sides of the seats and backs eliminates the wear on the sides of the cushions caused by the rubbing of such sides against the mechanism.

The guide means for the backs of the front and rear seats are of different construction, inasmuch as preferably the rear seat back guides are behind the back to better provide for concealment and easy installation thereof, whereas the guide means for the back 5 of the front seat are conveniently located at the ends of the back and forming a complete unit with the support which may be moved forward or back to suit the driver's needs when said seat is in normal position. Relative to the latter feature, it may be noted that the support 8 is slidably carried on a fixed base member 8' and movement of the support 8 with respect to the base may be effected by means of a screw 8'' without in any way disturbing the relationship between the support and the members carried thereby. The guide means for the back 5 comprises flat plate-like guide members 18 fastened to the front seat support 8, or to the body of the automobile, and extending upward along the ends of said back so as to be concealed by body pillars of the automobile when the seat is in normal position. Vertically extending slots 19 are provided in the members 18 and slidably receive guide pins 20 fixed in and extending outward from the ends of the back 5. These pin and slot connections provide for the desired guiding of the back 5 into and out of its two operative positions, as shown in Figure 1. When the back is in its normal position the pins 20 are disposed at the upper ends of said slot whereas they are disposed at the lower ends of the slot when the back is in bed or horizontal position. Due to the proximity of the bracket 12 and the hinge 7, any tendency to tilt will be prevented.

The guide means for the back 6 comprises upright tracks 22 preferably formed of strap iron and suitably fastened to the rear wall 23 of the car body, and guide members 24 which are on said tracks and pivoted as at 25 on the rear side of said back. The members 24 embrace the tracks 22 and function to guide the back 6 into and out of its operative positions, in the manner of the guide means for the back 5. Owing to the positioning of the tracks 22 against the rear end of the automobile body the guiding means for the rear seat back will be entirely concealed when the latter is in normal position.

It is now apparent that, to adjust the seats to a bed, it is merely necessary to lift the forward edges of seat frames 3 and 4 so that the stops may clear the side 10, then slide the seats forwardly. The backs 5 and 6 will now by gravity, as the seats 1 and 2 are moved forward, assume the horizontal position as shown in Figure 1. This disposition of the seats and back in contiguous relation and in the same horizontal plane provides for a full length, strong and secure bed surface which is subject to use as an ordinary bed. The back 6 is supported in horizontal position by the hinge connection thereof with the rear seat and by the guides 24 engaging stop portions 31 near the lower ends of the tracks. Preferably the stop 31 is so positioned that the back 6 will assume an inclined position when serving as a part of the bed. In this manner such back may serve as a pillow. It should be noted that either seat unit may be adjusted independent of the other. For use by children while the front seat is occupied, the rear seat and its back may be easily adjusted to provide a bed and this adjustment does not interfere with the ordinary use of the front seat and in fact leaves a clear space for storage, et cetera, behind the latter. The seat cushions may even be lifted out of their frames as in the usual automobile seat construction. This space also facilitates the operation of the rear seat unit from within the car, the operator then standing in said space. He may when so standing reach over the back 5 and lift and adjust the front seat and back, stepping then from said space onto the rear seat to make room for the back 5 as the latter assumes its horizontal position. In this way the operator need not get out of the car in making the adjustments of the seat. In returning the seats, the backs may be conveniently and easily lifted and will draw the seats to normal position, said seats automatically assuming their locked positions on the supports 8 therefor.

I claim:

1. In an automobile having front and rear seats and back rests movable from a normal seat position to a substantially horizontal and planar bed forming position, means for guiding the rear back rest from a substantially vertical to a horizontal position comprising a pair of arcuate rails disposed behind said back rest, a pair of brackets hingedly secured to said back rest adjacent the top thereof and slidably engaging said rails.

2. In an automobile having front and rear seats and back rests movable from a normal seat position to a substantially horizontal and planar bed forming position, means for guiding the rear back rest from a substantially vertical to a horizontal position comprising a pair of arcuate rails disposed behind said back rest, said rails being curved to recede from said back rest, a pair of brackets hingedly secured to said back rest adjacent the top thereof and slidably engaging said rails.

HENRY T. RATZLAFF.